Nov. 24, 1936.  A. G. REDMOND  2,062,070
LUBRICATING DEVICE
Filed Jan. 20, 1936   2 Sheets-Sheet 1
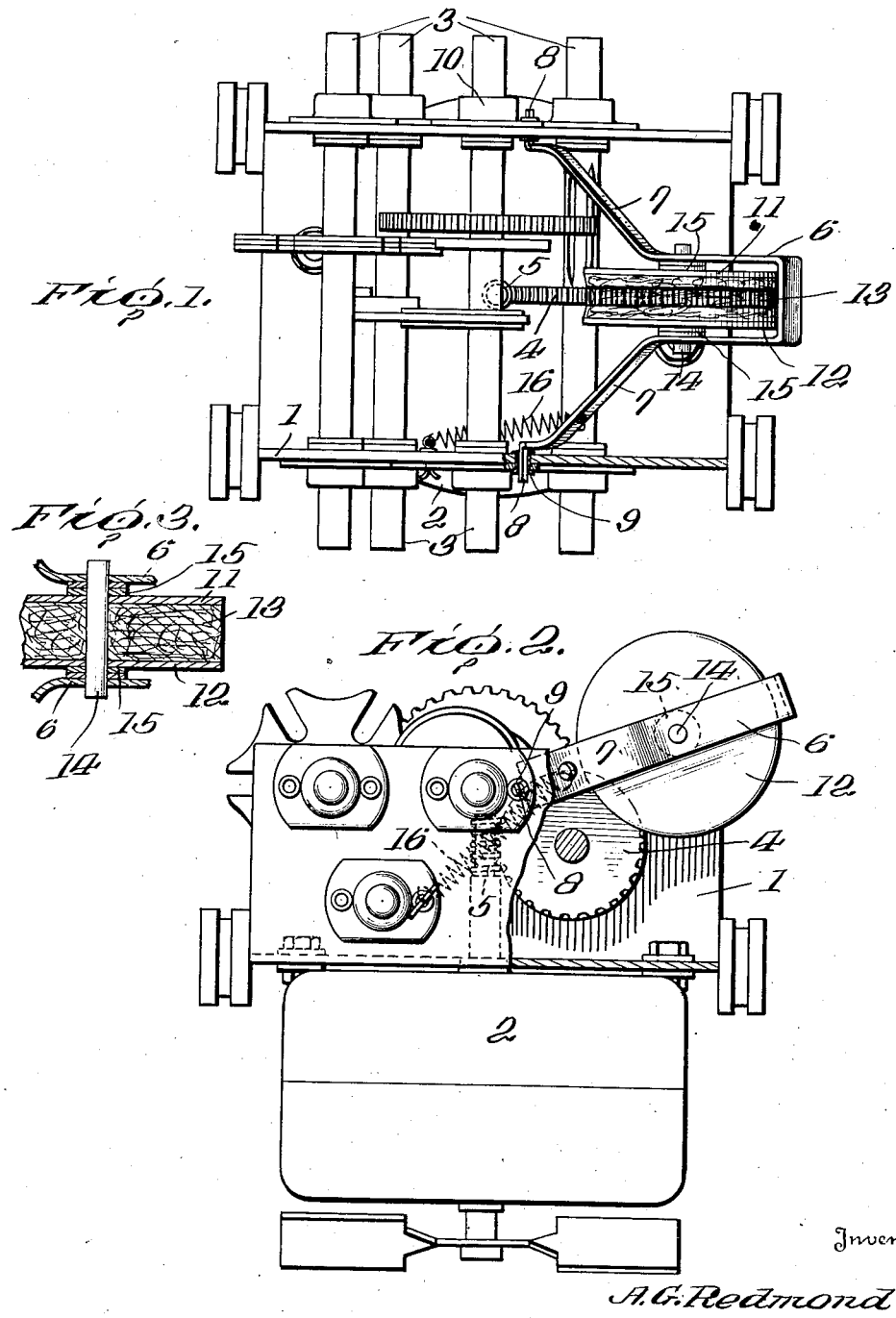
Inventor
A. G. Redmond
Attorneys Nov. 24, 1936.  A. G. REDMOND  2,062,070
LUBRICATING DEVICE
Filed Jan. 20, 1936   2 Sheets-Sheet 2
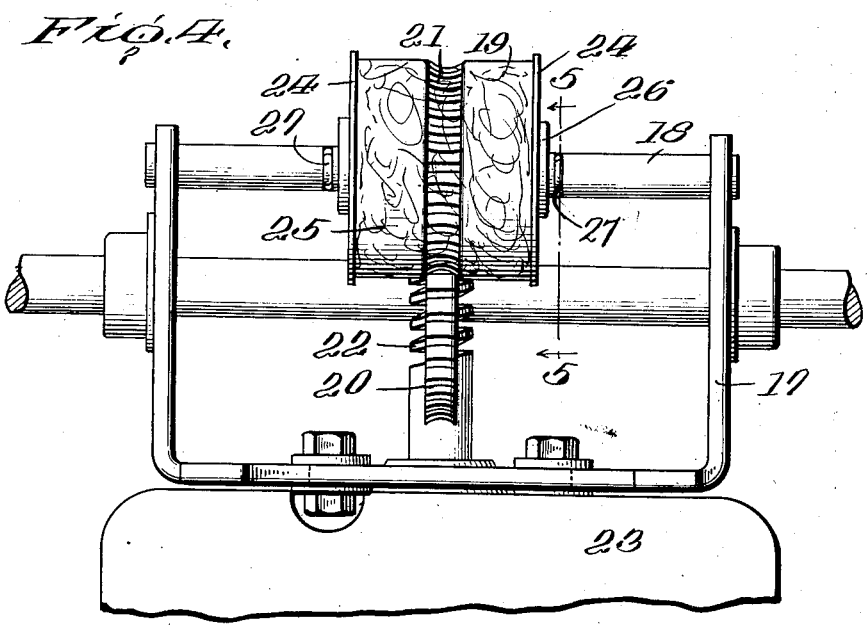
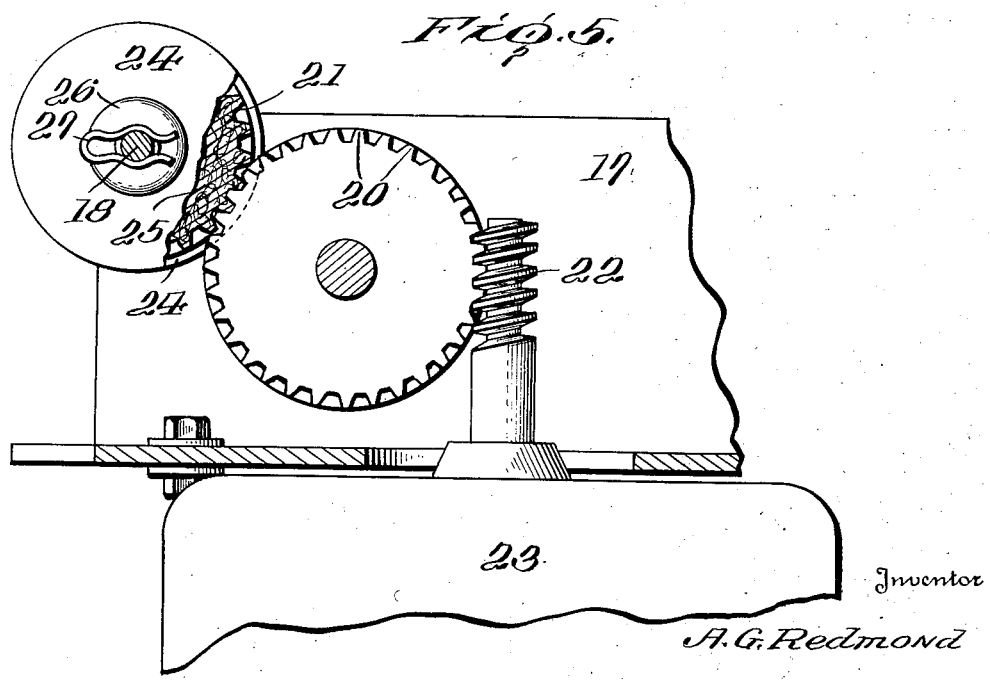
Inventor
A. G. Redmond

Patented Nov. 24, 1936

2,062,070

UNITED STATES PATENT OFFICE 2,062,070

LUBRICATING DEVICE

Albert G. Redmond, Flint, Mich.

Application January 20, 1936, Serial No. 59,980

2 Claims. (Cl. 184—102)

This invention relates to certain new and useful improvements in a lubricating device and more particularly to a lubricating device especially adapted to be used in connection with a driving mechanism, such as used on a display device, which is provided with four shafts, one driven at slow rotation, one at fast rotation, one at oscillation and one at indexing, the object being to provide means for lubricating the worm wheel in such a manner that the same will be thoroughly lubricated.

Another object of my invention is to provide a lubricating device which when filled does not have to be replenished for a great length of time as the same is constructed of a felt disc saturated with a lubricant in such a manner that the gear or worm will be thoroughly lubricated as it turns in contact with the disc.

Another object of my invention is to provide a lubricating device which in its original form consists of a felt disc having a smooth periphery in which are formed teeth by being held under pressure in contact with the worm wheel whereby said teeth will match perfectly with the teeth of the worm wheel so as to deposit and maintain a film of oil on the worm wheel, which in turn will lubricate the worm in engagement therewith whereby a perfect contact is obtained in order to thoroughly lubricate the gearing.

Other and further objects and advantages of the invention will be hereinafter set forth and the novel features thereof defined by the appended claims.

In the drawings,—

Figure 1 is a top plan view of a mechanism showing the application of my improved construction of lubricating device;

Figure 2 is a side view;

Figure 3 is a detail section;

Figure 4 is a detail elevation of a modified form of my improved construction of lubricating device; and Figure 5 is a section taken on line 5—5 of Figure 4.

In the drawings 1 indicates a frame carried by a motor 2 and provided with a plurality of driven shafts 3. Disposed on one of the shafts 3 is a worm wheel 4 which is driven by a worm 5 carried by the motor shaft and these shafts are connected together through driving members as shown, which forms no part of my invention, the above description being given so that the operation of my improved construction of lubricating device can be readily understood when applied to such a mechanism.

My improved lubricating device comprises a frame having a central substantially U-shaped portion 6 from which extend diverging arms 7 provided with reduced ends 8 which extend outwardly and are mounted in the eyelets 9 employed for holding the bearings 10 to the frame 1 which allows the frame 6 to swing on the reduced ends 8.

Mounted within the U-shaped portion 6 of the frame is a lubricating wheel comprising a pair of metal discs 11 and 12 between which is arranged a felt disc 13, the disc being apertured to receive a bearing shaft 14 which carries washers 15 for spacing the discs from the sides of the frame 6, said shaft being preferably upset or riveted to hold it in position within the frame.

One of the arms 7 of the frame is connected to the frame 1 by a coil spring 16 which holds the felt disc or washer in contact with the worm wheel 4 under pressure and in use the wheel embeds itself within the peripheral edge of the felt disc 13 and forms teeth in the felt by revolving contact therewith so as to thoroughly lubricate the same. This provides a construction which produces a gear wheel of felt, the teeth of which perfectly match the teeth of the worm wheel.

In the embodiment of my invention as shown in Figure 4, the frame 17 is provided with a shaft 18 on which is mounted a lubricating wheel 19 so positioned that the teeth 20 of the worm wheel form teeth 21 in the lubricating disc which is formed of felt so that a perfectly matched contact between the two gears is maintained at all times in order to lubricate the worm wheel which in turn lubricates the worm 22 of the motor 23 and in the drawings I have only shown a lubricating device and the cooperating parts, the other shafts being omitted.

The lubricating device 19 consists of a pair of spaced discs 24 between which is arranged a felt washer or disc 25, the same being secured together by an eyelet 26 which is revolubly mounted on the shaft 18 and is held in its proper position by spring clips 27 seated in grooves formed in the shaft as clearly shown. This provides a simple construction so as to thoroughly lubricate the worm wheel.

This provides a very simple and cheap lubricating device which can be readily attached or detached and one which will thoroughly lubricate the worm wheel a long time without being replenished with lubricant.

From the foregoing description it will be seen that in the preferred embodiment of my invention I have provided a lubricating device comprising a revolubly mounted lubricating wheel mounted in contact with the worm wheel by a spring so that the teeth of the worm wheel embed themselves in the periphery of the fabric disc to thoroughly lubricate the teeth of the worm wheel, which lubricant is conveyed to the worm so that the driving connection between the worm wheel and worm is thoroughly lubricated at all times.

In the other embodiments of my invention, the disc is so positioned in respect to the worm wheel that in installing the same, the disc is between the respective shafts of the worm and the lubricating disc is such that the teeth of the worm wheel embed themselves in the periphery of the felt lubricating disc so that in operation the teeth are formed therein.

What I claim is:

1. In a device of the kind described, the combination with a worm wheel, of a revolubly mounted felt disc so positioned in respect to the worm wheel that in the rotation of said wheel teeth are formed in the felt disc to perfectly match the teeth of the worm wheel in order to thoroughly lubricate the same.

2. In a device of the kind described, the combination with a driven gear wheel, of a revolubly mounted felt disc containing a lubricant, mounted to be held in contact with said gear wheel under pressure in order to form teeth in the periphery of the lubricating disc to match the teeth of the gear wheel by the rotation of said gear wheel and disc.

ALBERT G. REDMOND.